United States Patent
Murata et al.

[11] Patent Number: 6,087,466
[45] Date of Patent: Jul. 11, 2000

[54] POLYURETHANE AND POLYESTER POLYOL

[75] Inventors: Shigeru Murata, Suzuka; Yukio Inaba; Masahiko Yasuda, both of Yokkaichi; Tetsuya Nakajima, Tsu, all of Japan

[73] Assignee: Kyowa Yuka Co., Ltd., Tokyo, Japan

[21] Appl. No.: 09/194,394

[22] PCT Filed: Mar. 13, 1998

[86] PCT No.: PCT/JP98/01061

§ 371 Date: Nov. 25, 1998

§ 102(e) Date: Nov. 25, 1998

[87] PCT Pub. No.: WO98/44014

PCT Pub. Date: Aug. 10, 1998

[30] Foreign Application Priority Data

Mar. 27, 1997 [JP] Japan .................................. 9-075132

[51] Int. Cl.⁷ ........................... C08G 18/42; C07C 69/34
[52] U.S. Cl. ............................ 528/83; 525/440; 528/80; 560/198; 560/224
[58] Field of Search ....................... 528/80, 83; 525/440; 560/198, 224

[56] References Cited

U.S. PATENT DOCUMENTS 5,668,223  9/1997  Tadokoro et al. ...................... 525/440

FOREIGN PATENT DOCUMENTS

| | | |
|---|---|---|
| 0405300 | 2/1991 | European Pat. Off. . |
| 0545108 | 11/1992 | European Pat. Off. . |
| 0729990 | 4/1996 | European Pat. Off. . |
| 60-229918 | 11/1985 | Japan . |
| 63-161065 | 7/1988 | Japan . |
| 63-202613 | 8/1988 | Japan . |
| 2-232218 | 9/1990 | Japan . |
| 3-35072 | 2/1991 | Japan . |
| 3-121115 | 5/1991 | Japan . |
| 3-12115 | 5/1991 | Japan . |
| 3-54966 | 8/1991 | Japan . |
| 4-81414 | 3/1992 | Japan . |
| 5-262859 | 10/1993 | Japan . |
| 9-278934 | 10/1997 | Japan . |
| 96-09334 | 3/1996 | WIPO . |

*Primary Examiner*—Rabon Sergent
*Attorney, Agent, or Firm*—White & Case LLP

[57] ABSTRACT

The present invention provides a polyester polyol comprising within its molecular structure both structural units respectively represented by the following general formula (I) and general formula (II). In addition, the present invention provides a polyurethane using the polyester polyol of the present invention. This polyurethane exhibits excellent resistance to hydrolysis, resistance to alkali, mechanical strength, and the like.

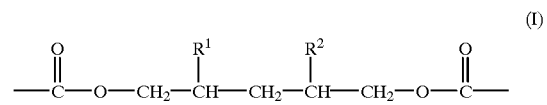

(I)

(wherein $R^1$ and $R^2$ are the same or different and each represents lower alkyl having 1 to 8 carbon atoms),

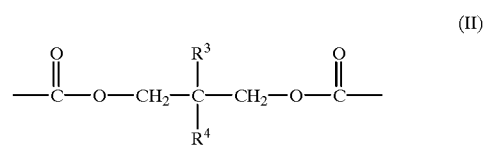

(II)

(wherein $R^3$ and $R^4$ are the same or different and each represents lower alkyl having 1 to 8 carbon atoms).

13 Claims, No Drawings

POLYURETHANE AND POLYESTER POLYOL

TECHNICAL FIELD

The present invention relates to a polyurethane and polyester polyol exhibiting excellent resistance to hydrolysis, resistance to alkali, and mechanical strength, and is useful as a material for extrusion molding material, such as in a hose, tube, film, sheet, belt, roll and the like; a material for injection molding material, such as in packing materials, machine parts, automobile parts, and the like; and a coating material such as in synthetic leather, paints, and adhesives and the like.

BACKGROUND ART

A polyurethane is produced by reacting a polyester polyol or polyether polyol, and a polyisocyanate in the presence of a chain lengthening agent such as a low-molecular weight diol, diamine or the like, if necessary. A polyurethane which is produced by using a polyester polyol is inferior in resistance to hydrolysis in composition with a polyurethane which is produced by using a polyester polyol. On the other hand, the use of polyurethanes which are produced by using polyether polyols is limited due to the problematic nature of their dynamic physical properties, weatherability, oil resistance, and solvent resistance.

Although polyurethanes which are produced by using polycarbonate polyols improve on the above described disadvantages, their cold resistance is inadequate, and they are extremely expensive, thus limiting their industrial use.

Heretofore, as a polyester polyurethane with a comparatively excellent resistance to hydrolysis, a polyurethane which is produced by using a polycaprolactone polyol is known [Polyurethane Resine Handbook, published by Nikkan Kogyo Shinbunsya (Sep. 25, 1987)].

In addition, examples of polyester polyurethanes derived from a chain diol possessing an alkyl side chain are known, i.e., neopentylglycol-derived or 2-butyl-2-ethyl-1,3-propanediol-derived polyester polyurethanes (Japanese Published Unexamined Patent Application No. 229918/85) and 3-butyl-1,5-pentanediol-derived polyester polyurethanes (Japanese Published Examined Patent Application No. 54966/92); however, from the standpoint of water resistance and the like, these compounds are inadequate for practical use.

There are descriptions of a polyester polyurethane formed from a chain diol possessing an alkyl side chain in Japanese Published Unexamined Patent Application No. 81414/92 and Japanese Published Unexamined Patent Application No. 262859/93, however there exists no concrete disclosure regarding a polyurethane which is produced by using a polyester copolymer derived from 2,4-dialkyl-1,5-pentanediol and 2,2-dialkyl-1,3-propanediol.

On the other hand, WO96/09334 discloses a polyester polyurethane derived from 2,4-diethyl-1,5-pentanediol as a polyurethane exhibiting excellent resistance to hydrolysis, weatherability, and alkali resistance. The polyurethane derived from 2,4-diethyl-1,5-pentanediol alone as the diol component of the starting material for the polyester polyol described in the Examples of the aforementioned application exhibits sufficient performance properties for most uses; however, under harsh usage conditions such as in the coating of underwater cables for use in petroleum exploration, connection cords of electrically powered heavy machinery or the like, the intrinsic properties of the aforementioned are insufficient from the standpoint of mechanical strength and resistance to abrasion. In addition, said application describes that 2-ethyl-2-butyl-1,3-propanediol may be added to 2,4-diethyl-1,5-pentanediol as a starting material for the polyester polyol, however no concrete description of these details exists.

DISCLOSURE OF THE INVENTION

A polyurethane of the present invention is a polyurethane possessing an intramolecular polyester portion comprising both structural units represented by the following general formula (1), and by the following general formula (II):

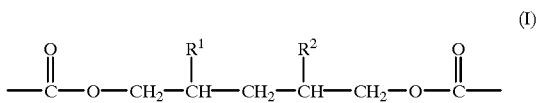

(wherein $R^1$ and $R^2$ are the same or different and each represents lower alkyl having 1 to 8 carbon atoms)

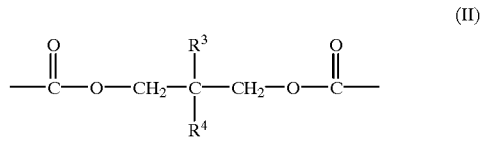

(wherein $R^3$ and $R^4$ are the same or different and each represents lower alkyl having 1 to 8 carbon atoms).

This polyurethane possesses an intramolecular polyester portion comprising both structural units respectively represented by general formula (I), and general formula (II), and thus exhibits excellent breaking strength and resistance to hydrolysis.

In addition, the present invention provides a polyester polyol for producing the aforementioned polyurethane, said polyester polyol containing within its molecular structure both structural units respectively represented by general formula (I), and general formula (II). The above mentioned polyester polyol is produced by carrying out dehydration-polycondensation or the like using a dicarboxylic acid component and a mixed diol comprising 2,4-dialkyl-1,5-pentanediol and 2,2-dialkyl-1,3-propanediol.

BEST MODES FOR CARRYING OUT THE INVENTION

In the definition of formula (I) and formula (II), the lower alkyl having 1 to 8 carbon atoms means a linear chain or branched chain alkyl, for example, a methyl, ethyl, propyl, isopropyl, butyl, isobutyl, sec-butyl, tert-butyl, pentyl, isoamyl, neopentyl, 2-pentyl, 3-pentyl, hexyl, heptyl, octyl, and the like.

The polyester polyol of the present invention can be produced by employing a conventional method, e.g., based on a method described in Japanese Published Unexamined Patent Application No. 101496/73, in which an esterification reaction is conducted using a dicarboxylic acid and a mixed diol comprising 2,4-dialkyl-1,5-pentanediol, the component which provides a structural unit represented by the aforementioned general formula (I), and 2,2-dialkyl-1,3-propanediol, the component which provides a structural unit represented by the aforementioned general formula (II).

The structural unit represented by the aforementioned general formula (I) is formed by carrying out an esterification reaction, using 2,4-dialkyl-1,5-pentanediol and a dicarboxylic acid or, ester exchange reaction using 2,4-dialkyl-1,5-pentanediol and a dicarboxylic acid ester, or the like. On the other hand, the structural unit represented by the aforementioned general formula (II) is formed by carrying out esterification reaction using 2,2-dialkyl-1,3-propanediol and a dicarboxylic acid or, ester exchange reaction using 2,2-dialkyl-1,3-propanediol and a dicarboxylic acid ester or the like.

A polyester polyol of the present invention comprises within its molecular structure both structural units represented by general formula (I) and general formula (II).

The polyester polyol of the present invention can be produced, for example, by initially carrying out a partial esterification reaction, and then further carrying out an esterification reaction on the resultant reaction product under the conditions of high temperature and reduced pressure. During the reaction, it is possible to jointly use a known esterification catalyst. The esterification reaction is preferably carrying out at 150~250° C., and more preferably at 180~230° C. Alternatively, a polyester polyol of the present invention can also be produced by initially carrying out an esterification reaction using either the 2,4-dialkyl-1,5-pentanediol or 2,2-dialkyl-1,3-propanediol and a dicarboxylic acid, followed by addition of the remaining diol for reaction with a dicarboxylic acid.

Furthermore, it is also possible to produce polyester polyol of the present invention by carrying out an ester exchange reaction according to a known method using a mixed diol comprising 2,4-dialkyl-1,5-pentanediol and 2,2-dialkyl-1,3-propanediol, and a dicarboxylic acid ester such as dicarboxylic acid methyl ester, ethyl ester or the like.

The polyester polyol of the present invention is a block copolymer or random copolymer formed from 2,4-dialkyl-1,5-pentanediol, 2,2-dialkyl-1,3-propanediol, and, if necessary, other diols added with a dicarboxylic acid.

Specific examples of 2,4-dialkyl-1,5-pentanediol include 2,4-dimethyl-1,5-pentanediol, 2-ethyl-4-methyl-1,5-pentanediol, 2-methyl-4-propyl-1,5-pentanediol, 2,4-diethyl-1,5-pentanediol, 2-ethyl-4-propyl-1,5-pentanediol, 2,4-dipropyl-1,5-pentanediol, 2-isopropyl-4-methyl-1,5-pentanediol, 2-ethyl-4-isopropyl-1,5-pentanediol, 2,4-diisopropyl-1,5-pentanediol, 2-isopropyl-4-propyl-1,5-pentanediol, 2,4-dibutyl-1,5-pentanediol, 2,4-dipentyl-1,5-pentanediol, 2,4-dihexyl-1,5-pentanediol, and the like. Among them, 2,4-dimethyl-1,5-pentanediol and 2,4-dipropyl-1,5-pentanediol are preferably used, and 2,4-diethyl-1,5-pentanediol is more preferably used.

2,4-Dialkyl-1,5-pentanediol can be obtained by reacting a 2-butenal derivative with formaldehyde, and then further hydrogenating the resultant reaction product according to a known procedure as described, for example, in Japanese Published Unexamined Patent Application No. 48642/96 and EP807617A.

Specific examples of 2,2-dialkyl-1,3-propanediol include 2,2-dipentyl-1,3-propanediol, 2,2-dihexyl-1,3-propanediol and the like. 2,2-Dimethyl-1,3-propanediol, 2,2-diethyl-1,3-propanediol, 2-methyl-2-propyl-1,3-propanediol, 2,2-dibutyl-1,3-propanediol and the like are preferably used; and 2-butyl-2-ethyl-1,3-propanediol is more preferably used.

2,2-Dialkyl-1,3-propanediol can be produced according to a known procedure as described, for example, in U.S. Pat. No. 2,413,803 or Japanese Published Unexamined Patent Application No. 69351/92.

The mixing ratio of 2,4-dialkyl-1,5-pentanediol and 2,2-dialkyl-1,3-propanediol as the starting materials for the polyester polyol of the present invention is preferably 98:2~85:15 (weight ratio) of 2,4-dialkyl-1,5-pentanediol: 2,2-dialkyl-1,3-propanediol. A polyurethane exhibiting excellent mechanical properties such as breaking strength and the like, and excellent resistance to hydrolysis can be produced when the weight ratio of 2,4-dialkyl-1,5-pentanediol is 85~98 wt % of the total weight of 2,4-dialkyl-1,5-pentanediol and 2,2-dialkyl-1,3-propanediol together.

It is also possible that the other diol is used with the mixed diol comprising 2,4-dialkyl-1,5-pentanediol and 2,2-dialkyl-1,3-propanediol as the starting material together. In such a case, the overall weight ratio of 2,4-dialkyl-1,5-pentanediol and 2,2-dialkyl-1,3-propanediol in all amout of diol is at least 30 wt % or more, and preferably at least 40 wt % or more. Examples of the other diol mentioned above include ethylene glycol, propylene glycol, 1,4-butanediol, diethylene glycol, 1,6-hexane glycol, 3-methyl-1,5-pentanediol, 1,4-bis($\beta$-hydroxyethoxy)benzene and the like.

Examples of the dicarboxylic acid used as a starting material for the polyester polyol of the present invention include aliphatic dicarboxylic acids such as succinic acid, adipic acid, azelaic acid, sebacic acid, maleic acid, fumaric acid and the like. Among the aforementioned saturated aliphatic dicarboxylic acids having 4 to 10 carbon atoms such as succinic acid, adipic acid, azelaic acid, sebacic acid, and the like are preferably used. When employing these dicarboxylic acids, it is possible to produce a polyurethane exhibiting excellent resistance to hydrolysis, alkali resistance and mechanical strength. The aforementioned dicarboxylic acids may be used alone or in combinations of two or more.

In addition, it is also possible to use other dicarboxylic acids besides said dicarboxylic acids as a starting material for the polyester polyol of the present invention. In such a case, the ratio of said dicarboxylic acids in all amount of dicarboxylic acid is 30 wt % or more, and preferably 40 wt % or more.

Examples of other dicarboxylic acids that can be jointly used include alicyclic dicarboxylic acids such as cyclopropane dicarboxylic acid and the like, and aromatic dicarboxylic acids such as phthalic acid, isophthalic acid, terephthalic acid, and the like.

The molar ratio of the diol to the dicarboxylic acid as a starting material for the polyester polyol of the present invention is not particularly limited, but is preferably 1.0~2.0.

The number average molecular weight of the polyester polyol of the present invention is preferably 400~8,000, and is more preferably 700~5,000. Polyurethanes which are produced by using polyester polyols with a number average molecular weight of 8,000 or more show poor dynamic properties.

The polyurethane of the present invention can be produced by employing a known polyaddition technique for the formation of urethane. In other words, polyurethane is produced by using the polyester polyol obtained in the aforementioned manner as an intermediate, uniformly mixing in, if necessary, a low-molecular weight compound (chain lengthening agent) having two or more active hydrogen atoms, preheating the mixture to about 60° C., adding a polyisocyanate to the mixture in such an amount that the molar ratio of the number of the active hydrogen atoms in the mixture to the number of isicyanate groups becomes 0.95~1:1.05, supplying the mixture to a continuous polymerization apparatus, equipped with a double axial screw, and mixing in a rotary mixer of a shot period time, and then conducting continuous random polyaddition. Alternatively, it is also possible to obtain the polyurethane of the present invention via a prepolymer of a terminal isocyanate group formed in advance by reacting the aforementioned polyester polyol with a polyisocyanate. The reaction is generally carrying out in the absence of a solvent, however it is also possible to carry out the reaction in a solvent such as dimethylformamide, dimethylsulfoxide, tetrahydrofuran, toluene, and the like. The solvents may be used alone or together in combinations of two or more.

Examples of the polyisocyanate include aromatic diisocyanates such as 4,4'-diphenylmethane diisocyanate, 2,4-tolylene diisocyanate, and the like, alicyclic diisocyanates such as isophorone diisocyanate, and the like, and aliphatic diisocyanates such as hexamethylene diisocyanate, and the like. The polyisocyanates may be used alone or in combinations of two or more.

As the chain lengthening agent, a low-molecular weight compound such as a diol or diamine having two or more active hydrogen atoms can be used. Examples of the chain lengthening agent include diols having 2 to 10 carbon atoms such as ethylene glycol, propylene glycol, 1,4-butanediol, diethylene glycol, 1,6-hexane glycol, and the like, and diamines having 2 to 10 carbon atoms such as propylene diamine, isophorone diamine, and the like. The chain lengthening agent may be used alone or in combinations of two or more. Thermoplastic polyurethane can be easily produced when using a compound having 2 or more active hydrogen atoms such as a diol or diamine as the chain lengthening agent.

The usage amount of the chain lengthening agent is not particularly limited, and is preferably 0.1~20 (molar ratio) times that of the polyester polyol, and is more preferably 0.3~10 (molar ratio) times that of the aforementioned.

Furthermore, it is also possible to use a monovalent low-molecular weight alcohol such as methanol, ethanol, or the like, or a monovalent low-molecular weight amine such as methylamine, ethylamine, or the like as a modifying agent, if necessary.

The weight average molecular weight of the polyurethane is preferably 60,000~500,000, and is more preferably 80,000~200,000.

When carrying out the polymerization reaction in the absence of a solvent, the resultant polyurethane can be subjected to fabrication immediately after the polymerization. In the case when, due to the polymerization conditions, the unreacted polyisocyanate exists 0.2 wt % or more in the polyurethane, the reaction is further conducted at 60–80° C. for 4–30 hours, if necessary, and then the polyurethane can be subjected to fabrication after completion of the reaction.

When the polymerization reaction is carried out in a solvent, a poor solvent for polyurethane, e.g., an aliphatic saturated hydrocarbon having 6 to 10 carbon atoms such as hexane, heptane, octane, nonane, decane, or the like, or methanol, ethanol, or the like is added, and the polyurethane is mixed to coagulate and precipitate, and then separated out by filtration. After drying the precipitate, the polyurethane can be subjected to fabrication.

The polyurethane obtained according to the present invention can be fabricated according to various methods. Examples of such fabrication methods include extrusion molding, injection molding, calendering, blow molding, and the like [Plastic Processing Technical Handbook, published by Nihon Kogyo Shinbunsya, pages 125, 213, 283 and 323 (1969) ] at 150~210° C., and preferably at 160~200° C.

EXAMPLES

Polyurethane of the present invention will be described below in detail by referring examples and experimental examples. However, the present invention is not limited to the thereto.

Example 1
Synthesis of polyester polyol

A mixed diol consisting of 58.46 kg of 2,4-diethyl-1,5-pentanediol and 3.73 kg of 2-butyl-2-ethyl-1,3-propanediol, and 37.81 kg of adipic acid were heated to 180~200° C., and dehydration-polycondensation was then conducted. From the time the acid value became 18~20 (KOH mg/g), the reaction was allowed to continue while reducing the pressure to 10~15 mmHg. When the acid value reached below 0.05 (KOH mg/g), the reaction was stopped to obtain the desired polyester polyol a. The properties of the resultant polyester polyol a are shown in Table 1. Furthermore, the number average molecular weight of the polyester polyol a was calculated from the hydroxyl value.

TABLE 1

| Polyester polyol | Acid value (KOH mg/g) | Hydroxyl value (KOH mg/g) | Water content (% by weight) | Number average molecular weight |
|---|---|---|---|---|
| a | 0.01 | 57.3 | 0.008 | 1993 |

Comparative Example 1
Synthesis of polyester polyol

Polyester polyol b was synthesized by dehydration-polycondensation as in Example 1, using 62.19 kg of 2,4-diethyl-1,5-pentanediol and 37.81 kg of adipic acid. The properties of the resultant polyester polyol b are shown in Table 2.

TABLE 2

| Polyester polyol | Acid value (KOH mg/g) | Hydroxyl value (KOH mg/g) | Water content (% by weight) | Number average molecular weight |
|---|---|---|---|---|
| b | 0.01 | 56.7 | 0.010 | 2014 |

Example 2
Preparation of Polyurethane

Using polyester polyol a obtained in Example 1, polyurethanes 1 and 2 were prepared by continuous polymerization reaction in the absence of a solvent with the proportion of compositions shown in Table 3. The polymerization device and polymerization conditions are as described below.

Pre-mixing: high-speed mixer, rotation=1000 rpm, temperature of 50~60° C.

Polymerization device: 30 mm double-axial, screw-type reaction extruder (manufactured by Ikegai Inc.), L/D (length of cylinder/inner diameter of cylinder)=42, production output=about 10 kg/hr Polymerization temperature: starting material supply opening 120° C., intermediate portion 220° C., and die opening 195° C.

Polymerization time: about 150 seconds

TABLE 3

| Polyurethane | Polyester polyol (kg) | Diphenyl methane diisocyanate (kg) | 1, 4 - Butanediol (kg) |
|---|---|---|---|
| 1 | a: 68.2 | 25.7 | 6.1 |
| 2 | a: 61.1 | 30.7 | 8.2 |

Table 4 shows the weight average molecular weights of polyurethanes 1 and 2. The weight average molecular weights of polyurethanes 1 and 2 were measured according to standard polystyrene calculation method by gel permeation chromatography (GPC).

(Conditions for GPC analysis)

Column: Two GMHHR-H (with inner diameter of 7.8 mm and length of 30 cm, manufactured by Toso Inc.) and a G2000HHR (with inner diameter of 7.8 mm and length of 30 cm, manufactured by Toso Inc.) are connected in series.

Moving phase: tetrahydrofuran (flow velocity of 1 ml/min)

Detector device: RI (RI-8000, manufactured by Toso Inc.)

TABLE 4

| Polyurethane | Weight-average molecular weight |
| --- | --- |
| 1 | 134,800 |
| 2 | 141,100 |

Example 2

(Preparation of polyurethane)

Using polyester polyol b obtained in Comparative Example 1, polyurethanes produced in the same manner as in Example 2, with the proportion of the shown in Table 5.

TABLE 5

| Polyurethane | Polyester polyol (kg) | Diphenylmethane diisocyanate (kg) | 1, 4 - Butanediol (kg) |
| --- | --- | --- | --- |
| 3 | b: 68.4 | 25.5 | 6.1 |
| 4 | b: 61.3 | 30.5 | 8.2 |

Table 6 shows the weight average molecular weights of polyurethanes 3 and 4. The weight average molecular weights were measured in the same manner as in Example 2.

TABLE 6

| Polyurethane | Weight-average molecular weight |
| --- | --- |
| 3 | 140,900 |
| 4 | 142,600 |

The resistance to hydrolysis, alkali resistance and mechanical strength of polyurethanes 1~4 obtained in the above-described manner were measured as follows.

Preparation samples for measuring mechanical strength

Using the polyurethanes produced in Example 2 and Comparative Example 2, a sheets with thickness of 300 μm were prepared by extrusion molding under the following conditions.

Extrusion molding device: 40 mm single-screw extruder (made by I.K.G. Co.), L/D (length of cylinder/inner diameter of cylinder)=28, compression ratio=1:2.8.

Extrusion conditions: (temperature) cylinder 1: 180° C.; cylinder 2: 190° C.; cylinder 3: 200° C.; cylinder 4: 200° C.; cylinder 5: 200° C.; die: 200° C.; screw rotations: 25 rpm.

Cylinders were numbered beginning from the nearest in proximity to the starting materials charge opening.

Tensile test of the polyurethane sheet was performed at 23° C. in accordance with JIS K-7311. The results are shown in Table 7.

TABLE 7

| Polyurethane | Hardness (JIS A) | 100% Modulus (kg/cm$^2$) | Breaking strength (kg/cm$^2$) | Ductility (%) |
| --- | --- | --- | --- | --- |
| 1 | 84 | 80 | 512 | 485 |
| 2 | 89 | 89 | 520 | 440 |
| 3 | 84 | 68 | 452 | 510 |
| 4 | 90 | 74 | 465 | 460 |

The polyurethanes 1, 2 of the present invention exhibit a superior breaking strength when compared with polyurethanes 3, 4 of the comparative examples.

Resistance to hydrolysis

Using the respective polyurethanes of Example 2 and Comparative Example 2, polyurethane sheets were prepared in the same manner as the aforementioned property measuring samples. These polyurethane sheets were dipped in heated water and maintained at 70° C. for 7, 14, 21 and 28 days periods. After removal of the water content, the breaking strength of each was measured at 23° C. according to JIS K-7311. The results are shown in Table 8.

TABLE 8

| Polyurethane | Breaking strength after 7 days (kg/cm$^2$) (Strength retention ratio %) | Breaking strength after 14 days (kg/cm$^2$) (Strength retention ratio %) | Breaking strength after 21 days (kg/cm$^2$) (Strength retention ratio %) | Breaking strength after 28 days (kg/cm$^2$) (Strength retention ratio %) |
| --- | --- | --- | --- | --- |
| 1 | 481 (94) | 445 (87) | 430 (84) | 399 (78) |
| 2 | 489 (94) | 489 (94) | 468 (90) | 437 (84) |
| 3 | 429 (95) | 398 (88) | 384 (85) | 339 (75) |
| 4 | 432 (93) | 428 (92) | 419 (90) | 395 (85) |

(Cf.) The values in parentheses represent the breaking strength retention ratio (%) after immersion in warm water based on the initial breaking strength.

It is understood from Table 8 that polyurethanes 1 and 2 of the present invention exhibit greater breaking strengths after immersion in warm water compared to polyurethanes 3 and 4 of Comparative Example, and, in addition, show excellent resistance to hydrolysis from the standpoint of breaking strength retention ratio.

Resistance to alkali

Using the polyurethanes produced in Example 2 and Comparative Example 2, test specimens of 2 mm in thickness were prepared by means of an injection molding device under the following conditions.

Injection molding machine: SG 75 manufactured by Sumitomo Heavy Industries, Inc.

Cylinder temperature: 190° C.–210° C.

Mold temperature: 35° C.

Injection time: 6–8 seconds

Injection pressure: 20 (kg/cm$^2$)

Holding: 35 (kg/cm$^2$)

A tensile test specimens was conducted at 23° C. after immersion in a 5 wt % solution of sodium hydroxide at 70° C. in accordance with JIS K-7311. The results are shown in Table 9. Breaking strength retention ratios and ductility retention ratios are values that were obtained by dividing the breaking strength and ductility before the immersion by the breaking strength and ductility after the immersion, and then multiplying respectively by 100.

TABLE 9

| Polyurethane | Breaking strength retention ratio (%) | Ductility retention ratio (%) |
| --- | --- | --- |
| 1 | 83 | 110 |
| 2 | 83 | 109 |
| 3 | 84 | 110 |
| 4 | 84 | 108 |

As shown by Table 9, the polyurethanes 1 and 2 of the present invention show excellent resistance to alkali.

Industrial Applicability

According to the present invention, a polyester polyol comprising two specific structural units as an ester portion is provided. When using polyester polyol of the present invention, it is possible to prepare a polyurethane that has excellent resistance to hydrolysis, alkali resistance and mechanical strength. Consequently, the polyurethane of the present invention is useful as a material for extrusion molding material, such as in hoses, tubes, films, sheets, belts, rolls and the like; a material for injection molding material, such as in packing material, machine parts, automobile parts, and the like; and a coating material such as in synthetic leather, paints, adhesives and the like.

What is claimed is:

1. A polyurethane possessing an intramolecular polyester portion comprising both structural units described by the following general formula (I):

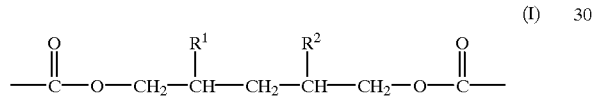

(I)

wherein $R^1$ and $R^2$ are the same or different and each represents lower alkyl having 1 to 8 carbon atoms, and the following general formula (II):

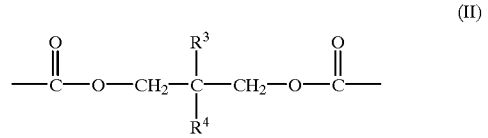

(II)

(wherein $R^3$ and $R^4$ are the same or different and each represents lower alkyl having 1 to 8 carbon atoms).

2. The polyurethane according to claim 1, wherein the weight average molecular weight of the polyurethane is 60,000~500,000.

3. The polyurethane according to claim 2, wherein $R^1$ and $R^2$ in general formula (I) are both ethyl.

4. The polyurethane according to claim 3, wherein in general formula (II), $R^3$ is ethyl and $R^4$ is butyl.

5. A process for producing a polyurethane, comprising the steps of: forming a polyester polyol by reacting a mixed diol comprising a 2,4-dialkyl-1,5-pentanediol and 2,2-dialkyl-1,3-propanediol with a dicarboxylic acid; wherein alkyl in the diol is a lower alkyl having 1 to 8 carbon atoms, and reacting said polyester polyol with a polyisocyanate.

6. The process for producing the polyurethane according to claim 5, wherein said dicarboxylic acid contains at least 40% by weight of succinic acid, adipic acid, azelaic acid, sebacic acid, maleic acid, or fumaric acid.

7. The process for producing the polyurethane according to claim 5, wherein said polyisocyanate is an aromatic diisocyanate, alicyclic diisocyanate or aliphatic diisocyanate.

8. A polyester polyol comprising within its molecular structure both structural units represented by the following general formula (III), and the following general formula (IV)

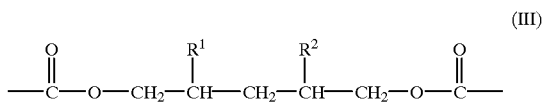

(III)

wherein $R^1$ and $R^2$ are the same or different and each represents lower alkyl having 1 to 8 carbon atoms,

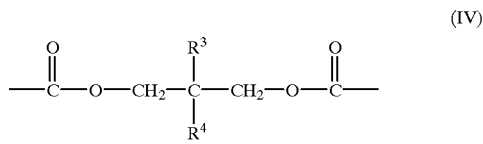

(IV)

(wherein $R^3$ and $R^4$ are the same or different and each represents lower alkyl having 1 to 8 carbon atoms).

9. The polyester polyol according to claim 8 wherein the number average molecular weight of the polyester polyol is 400~8,000.

10. The polyester polyol according to claim 9 wherein said polyester polyol is obtained by carrying out dehydration-polycondensation between a mixed diol comprising a 98:2~85:15 (weight ratio) mixed proportion of 2,4-dialkyl-1,5-pentanediol and 2,2-dialkyl-1,3-propanediol and a dicarboxylic acid component.

11. The polyester polyol according to claim 10 wherein said dicarboxylic acid contains 40 wt % or more of succinic acid, adipic acid, azelaic acid, sebacic acid, maleic acid, or fumaric acid.

12. The polyester polyol according to claim 9 wherein $R^1$ and $R^2$ in general formula (III) are both ethyl groups.

13. The polyester polyol according to claim 12 wherein in general formula (IV), $R^3$ is ethyl group and $R^4$ is butyl.

* * * * *